United States Patent [19]

Golston

[11] 4,076,623
[45] Feb. 28, 1978

[54] CONTINUOUS OSCILLATION OF LIQUID SEPARATOR

[75] Inventor: Stefan Golston, Bellevue, Ohio

[73] Assignee: Kamyr, Inc., Glens Falls, N.Y.

[21] Appl. No.: 748,286

[22] Filed: Dec. 7, 1976

[51] Int. Cl.² ............................................. B01D 33/00
[52] U.S. Cl. ..................................... 210/77; 210/384; 210/385; 210/388; 210/389; 210/393; 210/DIG. 18
[58] Field of Search ................. 210/77, 384, 385, 388, 210/389, DIG. 18, 106, 108, 359, 393; 209/346, 359, 360, 437, 442, 365 R, 365 A; 310/36, 37, 38; 318/114, 165, 171

[56] References Cited

U.S. PATENT DOCUMENTS

| 2,514,159 | 7/1950 | Jönsson | 210/384 |
| 2,781,130 | 2/1957 | Heckmann et al. | 210/384 |
| 3,372,087 | 3/1968 | Richter | 162/251 |
| 3,478,883 | 11/1969 | Deluca | 210/108 |
| 3,563,891 | 2/1971 | Richter | 210/315 |

Primary Examiner—Frank Sever
Attorney, Agent, or Firm—Cushman, Darby & Cushman

[57] ABSTRACT

A liquid separating screen member is continuously oscillated, with an amplitude larger than the apertures in the screen member face, from a middle position with substantially the same speed in first and second opposite directions. The screen member separates liquid from the suspension of finely comminuted fiber material and the liquid, which suspension is flowing in the first direction. The oscillation prevents fiber mat build-up on the screen face during movement of the screen face either in the first or the second direction. The amplitude of oscillation may be about one-tenth of an inch, and the frequency of oscillations may be about 6 cycles/sec. with the average speed of oscillation of the screen member in both the first and second directions about 2.4 inches per second, and the maximum speed in both directions about 3.8 inches per second. The frequency of oscillation, which is below the natural frequency of the screen member and associated structures, is about at least two cycles per second.

11 Claims, 3 Drawing Figures

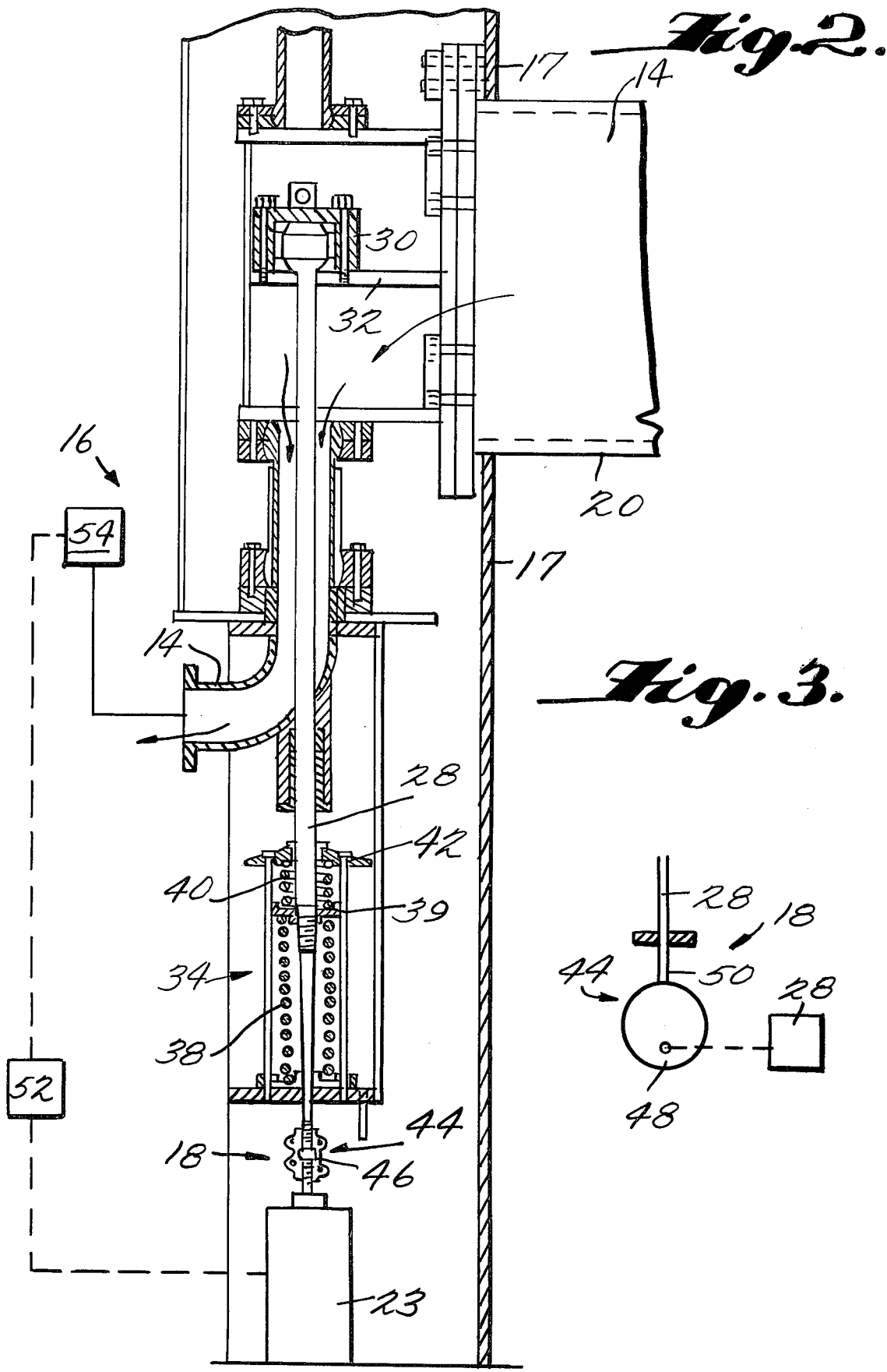

CONTINUOUS OSCILLATION OF LIQUID SEPARATOR

BACKGROUND AND SUMMARY OF THE INVENTION

The invention relates to a method and apparatus for the separation of liquid from a suspension of finely comminuted fiber material and the liquid. In the pulpmaking field there are many situations when liquid is separated from an established flow of a fiber material suspension, such as in thickening of the suspension, and in diffusing (i.e., chemical treatment of the suspension fibers as by bleaching, or washing of the suspension). Exemplary prior art methods and apparatus for accomplishing this are shown in U.S. Pat. Nos. 3,372,087 and 3,563,891, and in copending application Ser. No. 621,561, filed Oct. 10, 1975, at present pending. In such prior art arrangements, a screen member disposed in a flow of fiber material suspended in liquid is reciprocated back and forth along the direction of flow, reciprocation in the direction with the flow being relatively slow (matching the speed of suspension flow) so that a fiber mat is built up on the screen member face, and movement of the screen member opposite the direction of suspension flow being relatively rapid so that the fiber mat is separated from the screen face and so that backflushing of liquid through the screen face takes place. While such prior art arrangements are generally useful for thickening and diffusing, they have the following drawbacks; (a) no separation of liquid from suspension takes place during the downstroke of the screen member since backflushing takes place during the downstroke, therefore, the capacity of a screen member of given size is effectively reduced; (b) the backflushing — in addition to effectively lowering the capacity — may result in the contamination of a subsequent stage in a multi-stage arrangement where different liquids are diffused into the suspension at different stages; (c) the fiber mat build-up increases during the upstroke of the screen member along the direction of suspension flow so that the rate of separation of liquid decreases during the upstroke, with consequent non-uniform chemical treatment of the suspension when chemical treatment is effected; and (d) relatively large forces are necessary to overcome the friction of the built-up mat during the downstroke, therefore, a fair amount of energy must be used, and the screens must be of relatively heavy construction to maintain their structural integrity once subjected to such large forces.

According to the present invention, all of the above-mentioned disadvantages inherent in the prior art structures, as exemplified by U.S. Pat. Nos. 3,372,087 and 3,563,891, have been overcome. In particular, according to the present invention, no fiber mat build-up takes place on the screen member during any segment of its travel: this results in (1) completely uniform treatment since there is no fiber-mat to effect the rate of flow of liquid through the screen member; (2) no backflushing is necessary to remove a fiber mat (except in rare instances as will be described hereinafter) and thus there is no chance of contamination of the next stage of a multi-stage arrangement; (3) higher capacity can be achieved for a given screen area since there is no wasted time in a downstroke; and (4) since the frictional forces of the screen member relative to the suspension are relatively small because of the absence of a fiber mat, the screen members can be of lighter construction, and the energy requirements for the screen movement can be reduced.

According to the present invention, a method for effective separation of a liquid from a suspension of finely comminuted fiber material and the liquid is practiced comprising the steps of establishing a flow of suspension in a first direction, contacting the flowing suspension with at least one screen member having an apertured face and having a conduit leading away from the face to an area remote from the flow, removing separated liquid from the flow through the conduit, and moving the screen member alternately in the first direction and in the second direction opposite to the first direction; the improvement according to the invention comprises effecting the screen-moving step by continuously oscillating the screen member, with an amplitude larger than the apertures in the screen member face, from a middle position with substantially the same speed in the first and second directions so that fiber mat build-up on the screen face does not take place during movement of the screen face either in the first or second direction. Normally, the apertures in the screen member face are approximately 1/16 inch along the first direction, and the screen member is preferably oscillated with an amplitude of about 1/10 inch. The frequency of oscillation of the screen member is below the natural frequency of the screen member and associated structures, and is at least two cycles per second. Where the speed of flow of the suspension in the first direction is conventional (about 1/10 inch per second), the average speed of oscillation of the screen member in both the first and second directions is about 2.4 inches per second, and the maximum speed in both directions is about 3.8 inches per second for a typical amplitude and frequency of oscillations. Oscillating means effect the oscillating step according to the present invention, and the oscillating means are automatically sensed so that should the oscillating means labor, backflushing of the screen member is automatically effected to eliminate any fiber mat build-up that might have occurred on the screen members to cause the laboring of the oscillating means.

The apparatus according to the present invention comprises a system for effecting separation of the liquid from the suspension of finely comminuted fiber material and the liquid, which suspension is flowing in a first direction, and includes at least one screen member having an apertured face thereof disposed in the flow of suspended fiber material and having a conduit leading away from said face to an area remote from the flow to remove separated liquid from the flow, and apparatus for moving the screen member with respect to the flowing suspension both generally in the first direction and in the second direction opposite the first direction; the improvement according to the present invention consists of the apparatus for moving the screen member comprising means for continuously oscillating the screen member with an amplitude larger than the apertures in the screen member face (the dimensions of the apertures along the first direction), from a middle position with substantially the same speed in both the first and second directions so that fiber mat build-up on the screen face does not take place during movement of the screen face either in the first or second directions. The oscillating means may comprise a synchronous electric motor, and the synchronous electric motor may be connected to the screen member for oscillation of the same through a cam and cam follower assembly. Means may be provided for supporting the majority of the weight of the screen member so that the load on the oscillating means is minimized, and such supporting means may comprise a spring system in operative association with the rod connecting the oscillating means to the screen member. Rotating spray tubes may be provided so that the apparatus can function both as a thickener or a diffuser (bleacher or washer).

It is the primary object of the present invention to provide a method and apparatus for effecting separation of a liquid from a suspension of finely comminuted fiber material and the liquid utilizing a screen member, wherein the fiber mat build-up does not take place on the screen member. This and other objects of the invention will become apparent from an inspection of the detailed description of the invention, and from the appended claims.

BRIEF DESCRIPTION OF THE DRAWINGS

FIG. 2 is a detail of the screen moving means according to the present invention; and FIG. 3 is a schematic of an alternatively embodiment of the connection of the oscillating means to the screen member according to the present invention.

DETAILED DESCRIPTION OF THE INVENTION

Figure 1:
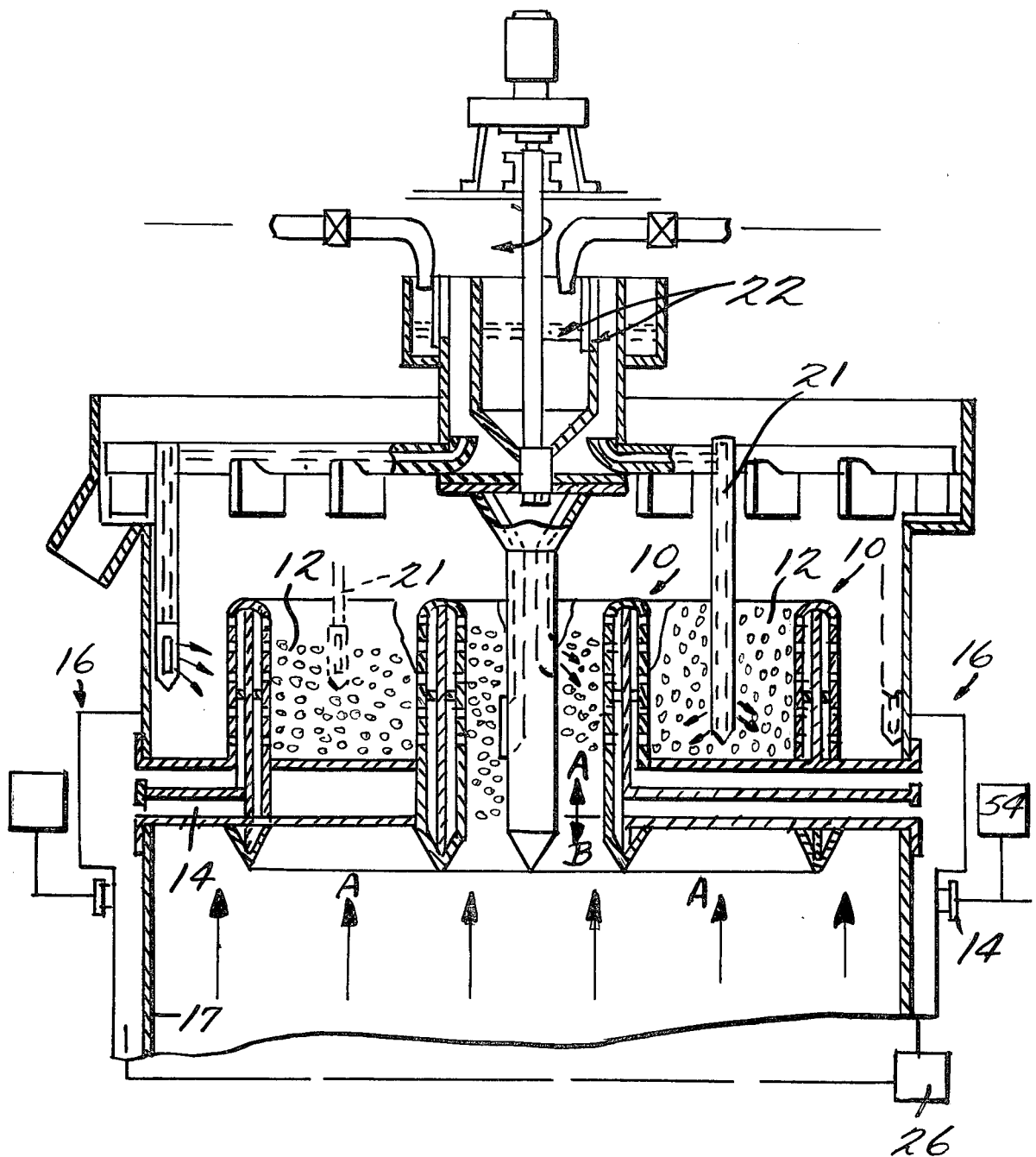
FIG. 1 is an axial view, with some elements in cross-section and others in elevation, showing an exemplary assembly according to the present invention.

Apparatus for effecting separation of a liquid from a suspension of finely comminuted fiber material and liquid is shown schematically in FIG. 1. The suspension of fiber material is flowing in a first direction A, contained by container walls 17. The apparatus according to the invention includes at least one screen member 10 having an apertured face 12 thereof disposed in the flow of suspended fiber material, and having a conduit 14 leading away from the face 12 to an area remote from the flow to remove separated liquid from the flow, and apparatus 16 for moving the screen member 10 with respect to the flowing suspension both generally in the first direction A and in the second direction B opposite the first direction. As is conventional in the art, the screen member 10 may take the form of generally cylindrical rings having an axis extending along the direction of flow A of the suspension (see FIG. 1), and the conduit 14 may comprise a plurality of arms 20 leading from the screen members generally perpendicular to the direction A, the arms 20 supporting the screen members for movement and extending through the container walls 17. Any number of cylindrical rings 10 may be provided, extending on one or both sides of the arms 20, as is conventional in the art. When the apparatus is to be used as a diffuser (i.e., for bleaching or washing), a plurality of rotating spray tubes 21 may be provided for introducing treatment liquid from liquid conduits 22 into the flowing suspension, the liquid from the spray tubes moving through the suspension to treat the fiber therein, and then passing through the apertured faces 12 of the screen member 10. The largest dimension of the apertures in the screen face 12 along the direction of flow A of the suspension (along the axis of the screen members 10) is conventionally about 1/16 inch.

According to the present invention, the apparatus 16 for moving the screen member comprises means 18 for continuously oscillating the screen member, with an amplitude $\alpha$ larger than the apertures in the screen member face 12, from a middle position with substantially the same speed V in both the first and second directions A and B, so that fiber mat build-up on the screen face 12 does not take place during movement of the screen face 12 in either the first or second directions A or B. The oscillating means 18 preferably comprises a plurality of oscillating devices 23 (one for each arm 20), and means 24 for mounting each oscillating device 23 to an arm 20. The means 23 may comprise a synchronous electric motor, suitable motors being commercially available, or other conventional oscillators such as electromagnetic and hydraulic oscillators may be utilized. An impact-type oscillator should not be utilized, however. A common control 26 is provided for all of the oscillating devices 23 to ensure simultaneous operation thereof at the same speed in the same directions.

The means 24 for mounting the oscillating devices 23 to arms 20 preferably comprises — for each oscillating device and arm — a connecting rod 28, a captivating bushing 30 for mounting the rod 28 to a support plate 32 of arm 20, and means 44 for connecting the oscillating device 23 to rod 28. Additionally, means 34 may be provided for supporting the majority of the weight of the screen member 10 so that the load on the oscillator 23 is minimized. Such supporting means 34 — as shown in FIG. 2 — may include a spring system having a first spring 38 which actually supports a share of the weight of the arm 20 and associated screen assembly 10, the spring 38 acting on the rod 28 through the connection shoulder 39, and a second spring 40 may be provided for compressing the first spring 38. Both the first and second springs 38, 40 may be maintained under compression at all times by compressing assembly 42.

The means 44 for connecting the oscillating device 23 to rod 28 may comprise any suitable connection, such as the screw threaded collar 46 shown in FIG. 2, the collar 46 having opposite hands of thread on the opposite ends thereof for fine adjustment of the vertical position of arm 20. Alternatively, connection may be provided — as shown in FIG. 3 — by a cam or eccentric 48 and a cam follower 50. Of course, a rotary motor or oscillator 23 would be utilized in the arrangement shown in FIG. 3 rather than a reciprocating motor as shown in FIG. 2.

Although according to the present invention fiber mat build-up will not occur at all on the apertured faces 12 under normal circumstances, should — for some aberrant condition — a fiber build-up take place on a portion of a screen face 12, the oscillating device 23 would have a tendency to labor because of the increased weight of the screen member-arm assembly 10–20. This laboring of the oscillating device 23 would be sensed by a suitable sensing means 52, and this would activate a backflushing arrangement 54. The arrangement 54 could be a high pressure source of liquid which would be temporarily brought into communication with the conduit 14 to backflush through the apertured face 12 and remove the fiber mat therefrom.

According to the method of the present invention, separation of a liquid from a suspension of finely comminuted fiber material and the liquid is effected. The method includes the conventional steps of establishing a flow of suspension in the first direction A, contacting the flowing suspension with at least one screen member 10 having an apertured face 12 and a conduit 14 leading away from the face to an area remote from the flow, removing separated liquid from the flow through the conduit 14, and moving the screen member 10 alternately generally in the first direction A and in a second direction B opposite the first direction; and the improvement comprises effecting the screen-moving step by continuously oscillating the screen member 10 with an amplitude $a$ larger than the apertures in the screen member face 12, from a middle position with substantially the same speed V in the first and second directions A, B so that fiber mat build-up on the screen face 12 does not take place during movement of the screen face 12 either in the first or second directions A, B. As previously stated, the dimension D of the apertures in the screen face 12 along the direction A is normally about 1/16 inch; in such a situation, an exemplary amplitude of oscillation of the screen member 10 is $a = 0.1$ inch, giving a total length of travel of the screen member 10 of $L = 0.2$ inches. A larger amplitude may be utilized if desired depending on the particular suspension concentration, treatment chemical, suspension flow rate, screen aperture dimensions, etc. The frequency F of oscillation of the screen member is below the natural frequency of the screen member 10 and arms 20 (the natural frequency thereof conventionally being about 40 CPS to 60 CPS) and preferably is at least about two cycles per second. Normally, the frequency is about six cycles per second, and with an amplitude of 0.1 inch the average speed of oscillation of the screen member in both the first and second directions A and B is about 2.4 inches per second, and the maximum speed in both the directions A, B is about 3.8 inches per second. Given the conventional speed of flow of the suspension of 0.1 inches per second, the speed of suspension flow is negligible with respect to the speed of the screen member, and proper liquid separation without fiber mat build-up takes place. When the method according to the present invention is practiced — even with a stock consistency of 12% — assuming $a = 0.1$ inch and $F = 6$ cycles/sec. the maximum loads on the arms 20 are only about 13,900 lbs. (which may be reduced considerably by the utilization of the spring system 34), and the power requirement of the oscillator is only about five horsepower or less. This allows the screen member 10 to be of relatively light construction, and can reduce the total cost of construction and energy requirements for the liquid separation.

It will thus be seen that according to the present invention a method and apparatus have been provided which prevent fiber mat build-up on a moving screen in a fiber material suspension flow, thereby increasing the efficiency of liquid separation from the flow. Thus, the objects of the present invention have been accomplished.

While the invention has been herein shown and described in what is presently conceived the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. Apparatus for effecting separation of a liquid from a suspension of finely comminuted fiber material and the liquid, which suspension is flowing in a first direction, including at least one non-rotatable screen member having an apertured face thereof disposed in the flow of suspended fiber material and having a conduit leading away from said face to an area remote from said flow to remove separated liquid from the flow, and apparatus for moving the screen member with respect to the flowing suspension both generally in the first direction and in a second direction opposite the first direction, wherein the improvement comprises
said apparatus for moving said screen member comprising oscillating means for continuously oscillating the screen member said oscillating means further comprising frequency inducing means which functions to produce a frequency below the natural frequency of said apparatus, and amplitude inducing means which functions to produce an amplitude larger than the apertures in the face of said screen member; from a middle position with substantially the same average speed in both the first and second directions so that fiber mat build-up on said screen face does not take place during movement of said screen face either in said first or said second directions, so as to essentially eliminate backflushing through said face while said screen is oscillating.

2. Apparatus as recited in claim 1 wherein said continuously oscillating means comprises a synchronous electric motor.

3. Apparatus as recited in claim 2 wherein said synchronous electric motor is connected to said screen member for oscillation of same through a cam and cam follower assembly.

4. Apparatus as recited in claim 1 further comprising a plurality of spray tubes extending parallel to the direction of flow of said suspension for introducing diffusing liquid into said suspension, which liquid is removed by said screen members, and wherein a plurality of screen members are provided, each of said screen members comprising a generally cylindrical ring, having an axis extending along the direction of flow of said suspension, and wherein said conduit comprises a plurality of arms leading away from said screen members generally perpendicular to said first direction, and wherein said means for oscillating said screen members comprises a plurality of oscillating devices, one mounted to each of said arms and a common control being provided for actuating said oscillating devices continuously simultaneously.

5. Apparatus as recited in claim 1 wherein said oscillating means is connected to said screen member for oscillation of same through means for supporting the majority of the weight of said screen member so that the load on said oscillating means is minimized.

6. Apparatus as recited in claim 5 wherein said supporting means comprises a spring system in operative association with a rod connecting said oscillating means to said screen member.

7. A method for effecting separation of a liquid from a suspension of finely comminuted fiber material and the liquid comprising the steps of establishing flow of said suspension in a first direction, contacting the flowing suspension with at least one non-rotatable screen member having an apertured face and having a conduit leading away from the face to an area remote from said flow, removing separated liquid from the flow through said conduit, and moving said screen member alternately generally in said first direction and in a second direction opposite said first direction, wherein the improvement comprises
effecting said screen-moving step by continuously oscillating said screen member with an oscillating means; the oscillating means comprising frequency inducing means which functions to vibrate at least said screen member at a frequency below the natural frequency of said screen member, and amplitude inducing means which functions to produce an amplitude larger than the apertures in the face of said screen member; from a middle position with substantially the same average speed in both the first and second directions so that fiber mat build-up on said screen face does not take place during movement of said screen face either in said first or said second directions, so as to essentially eliminate backflushing through said face while said screen is oscillating.

8. A method as recited in claim 7 wherein the apertures in said screen member face are approximately 1/16 in., and wherein the screen member is oscillated with an amplitude of about 1/10 in.

9. A method as recited in claim 8 wherein the frequency of oscillation of said screen member is below the natural frequency of said screen member and associated structures, and is about at least 2 cycles/sec.

10. A method as recited in claim 7 wherein the speed of flow of said suspension in said first direction is about 1/10 in./sec., and wherein the average speed of oscillation of said screen member in both said first and second directions is about 2.4 in./sec., and the maximum speed in both said directions is about 3.8 in./sec.

11. A method as recited in claim 7 wherein said oscillating step is effected by oscillating means, and wherein said method comprises the further steps of automatically sensing laboring of said oscillating means, and effecting backflushing of said screen member in response to labor sensing of said oscillating means.

* * * * *